United States Patent [19]

Bahder

[11] 4,256,921
[45] Mar. 17, 1981

[54] MOISTURE RESISTANT CABLE

[76] Inventor: George Bahder, 24 Highpoint Dr., Edison, N.J. 08817

[21] Appl. No.: 5,320

[22] Filed: Jan. 22, 1979

[51] Int. Cl.³ .............................................. H01B 7/28
[52] U.S. Cl. ................................ 174/107; 174/102 D; 174/102 SC; 174/106 D
[58] Field of Search .......... 174/102 D, 105 R, 106 D, 174/102 SC, 105 SC, 106 SC, 107

[56] References Cited

U.S. PATENT DOCUMENTS

| | | | |
|---|---|---|---|
| 3,638,306 | 2/1972 | Padowicz | 174/107 X |
| 3,651,244 | 3/1972 | Silver | 174/105 R X |
| 3,681,515 | 8/1972 | Mildner | 174/102 D X |
| 3,735,025 | 5/1973 | Ling | 174/105 C X |
| 3,785,048 | 1/1974 | Petersen | 174/102 D X |
| 3,824,330 | 7/1974 | Lang | 174/102 D |
| 3,943,271 | 3/1976 | Bahder | 174/102 SC |
| 3,980,807 | 9/1976 | Woytiuk | 174/107 |
| 4,145,567 | 3/1979 | Bahder | 174/107 |

FOREIGN PATENT DOCUMENTS

| | | | |
|---|---|---|---|
| 605020 | 9/1955 | Canada | 174/102.6 |
| 764175 | 2/1934 | France | 174/102 D |
| 1419843 | 10/1965 | France | 174/107 |
| 4419304 | 11/1966 | Japan | 174/102 D |

Primary Examiner—Richard R. Kucia
Attorney, Agent, or Firm—Darby & Darby

[57] ABSTRACT

A high voltage cable which has a composite jacket having inner and outer parts. A corrugated moisture barrier is sandwiched between the parts and bonded to them. The jacket prevents both radial and longitudinal flow of moisture in the cable. The moisture barrier may serve as a return conductor or the jacket may include additional return conductors.

10 Claims, 5 Drawing Figures

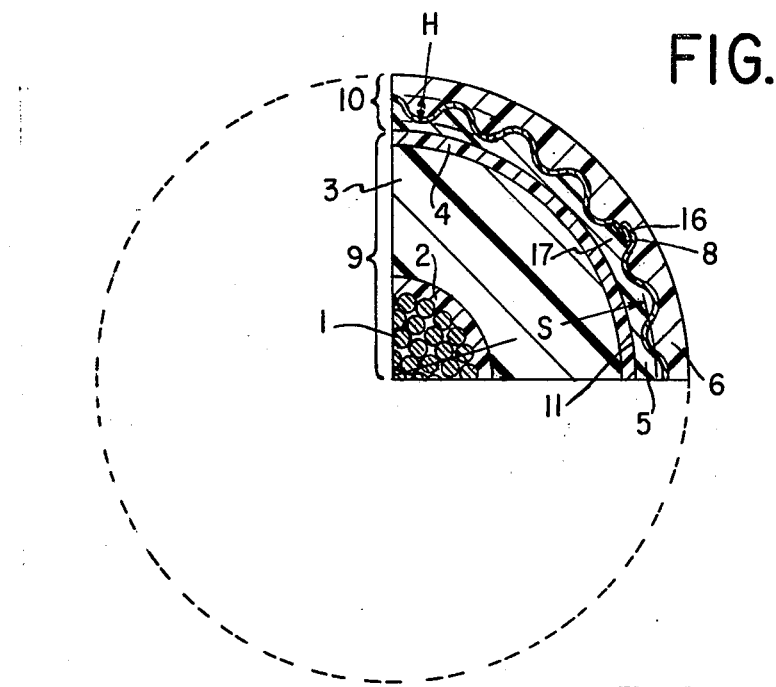
FIG. 1a
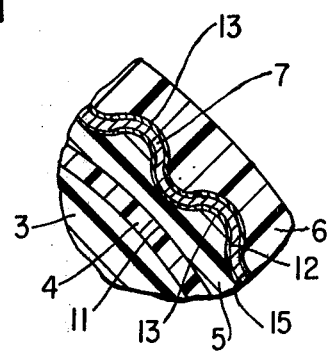
FIG. 1b
FIG. 2
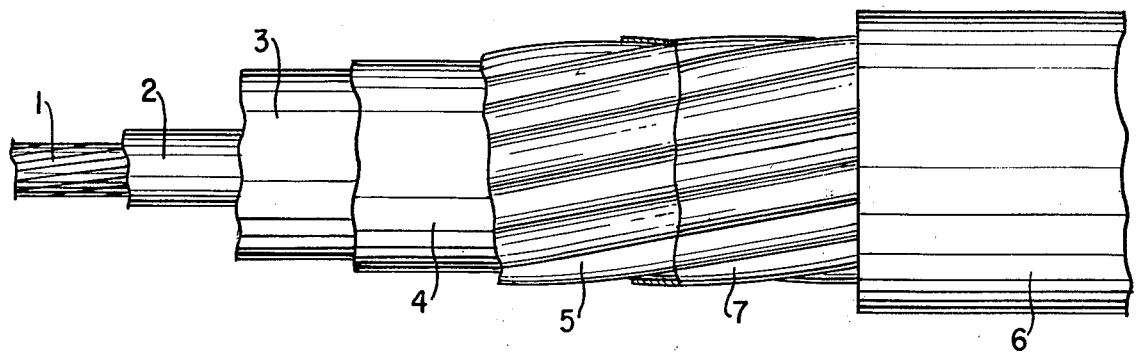
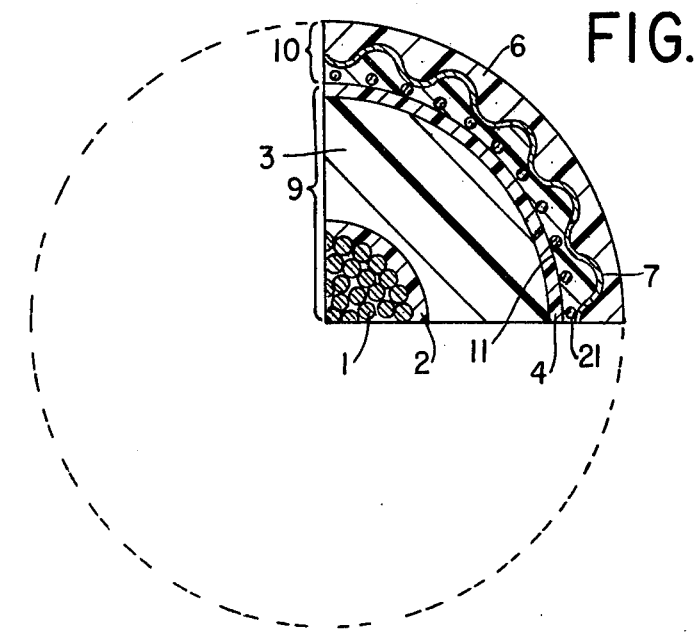
FIG. 3a
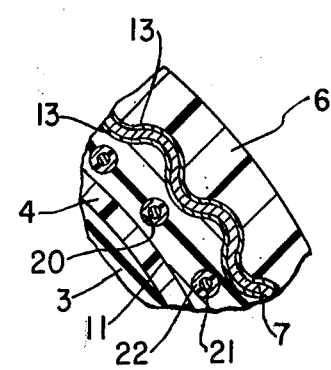
FIG. 3b

MOISTURE RESISTANT CABLE

In recent years, wide use has been made of underground cables for the transmission and distribution of electrical power. Aside from the obvious aesthetic advantages provided by underground power distribution, such underground distribution networks offer relative immunity from damage due to environmental factors such as lightning, high winds, and ice formation. Typical underground distribution networks are comprised of polyolefin-insulated extruded cables. The polyolefin-insulation may comprise a material such as polyethylene, cross-linked polyethylene or ethylene propylene rubber among others. The cables may be directly buried or installed in ducts. Regardless of the method of installation of the cables, they are exposed to fairly high levels of environmental moisture.

It is known that the intermolecular spaces of polyolefin insulation are large, thus rendering such insulation susceptible to the diffusion of molecules of moisture into the spaces. This property of polyolefin insulation renders it susceptible to a type of insulation deterioration known as "electrochemical tree formation". Insulation exhibiting long electrochemical trees may have a breakdown voltage lower than the level of switching surges or the level of operating voltages. The service life of polyolefin cables such as those described above, therefore, may be limited to periods as short as fifteen years due to the electrochemical tree formation phenomenon.

It is also known that the rate of growth of electrochemical trees is greater where a.c. voltages rather than d.c. voltages are applied to the cable. Furthermore, the rate of tree formation and growth increases with an increase of the average and local voltage stresses in the insulation. Tree formation is most likely where there are voids in the insulation in which excessive amounts of moisture tend to accumulate, and where imperfections or impurities in the cable tend to create high local field stresses.

Electrochemical trees are believed to be formed in the following manner. Environmental moisture, which has a high dielectric constant and high conductivity, diffuses throughtout the insulation layer of the cable via the large intermolecular spaces in the insulation. This moisture forms into droplets, both in the intermolecular spaces and in microvoids and voids which may be present in the body of the insulation. Under electric fields, electrostatic forces acting on the droplets cause them to elongate in the direction of the field. Due to this elongation the radii of the ends of the droplets decrease and the strength of the electric field at these ends consequently increases.

At sufficiently high field strengths, small electrical discharges occur at the ends of the droplets causing decomposition of the insulation in the region of these discharges. Moisture enters into the decomposed area the insulation thereby moving the electrical discharge region further into the insulation. In this manner, an ever enlarging pattern of channels or voids forming an "electrochemical tree" is formed in the insulation, and the breakdown voltage of the insulation in the area of the tree decreases as the size of the tree increases.

Efforts have been made to minimize the treeing effect by reducing the number of imperfections and areas of impurity in the cable at which high local field stresses cause the formation of electrochemical trees to begin. Efforts have also been made to reduce the number of voids within the insulation at which moisture tends to accumulate. None of the above efforts, however, have been successful in reducing the treeing effect to an acceptable level.

It is believed, therefore, that the most effective means for preventing the formation of electrochemical trees, or at least reducing the rate of such tree formation to an acceptable level, is one which prevents environmental moisture from diffusing into the insulation layer of a polyolefin insulated cable.

It has been found that in certain applications, saturation of the insulation layer of a polyolefin insulated cable with a liquid having high resistivity and a low dielectric constant can be effective in retarding the diffusion of moisture through the insulation. The rate of formation and growth of electrochemical trees is, thereby reduced to a low level. As a consequence of this retardation of electrochemical tree formation, a significant increase in the useful life of the cable may be achieved.

The details as to the method of saturating the insulation of cables with the tree retardant liquid, and the liquids which are suitable for this purpose, are described in applicant's copending application Ser. No. 005,321 for "Extension of Cable Life". The method of treatment therein described is particularly effective for distribution type cables such as those operating at voltages of 5000 volts a.c. and above. This method suffers from a problem, however, in that liquids suitable for electrochemical tree retardation must have molecular weights sufficiently low so that the liquid can diffuse into the intermolecular spaces in the polyolefin insulation of the cable. Unfortunately, such liquids tend to diffuse completely through the insulation and out of the cable after a number of years, thereby again leaving the cable susceptible to electrochemical tree formation.

The problem of electrochemical tree formation is particularly troublesome in distribution and transmission type cables operating at 5 kv. or above, since the formation of electrochemical trees occurs more rapidly under high voltage and related to this high electric stresses. The relatively high susceptibility of high voltage type cables to electrochemical tree formation make it particularly desirable that such cables be protected from moisture by, for example, providing them with a moisture impervious covering or jacket.

Moisture impervious coverings such as lead or aluminum sheaths have been used successfully in the past for oil paper insulated cables. For the reasons discussed below, however, the use of such sheaths is not a practical method for preventing moisture from entering the insulation of cables of the solid dielectric type (e.g., polyolefin).

Due to the high coefficient of thermal expansion of solid dielectric insulation, lead or aluminum sheaths must expand to conform to the increased diameter of the cable core which results from the elevated temperature reached under typical operating conditions. When the cable core is returned to a lower temperature, the diameter of the core is reduced. The diameter of the lead or aluminum sheath, however, does not become correspondingly smaller, and a longitudinal channel is thus left between the lead or aluminum sheath and the insulation shield of the cable. If moisture subsequently penetrates the sheath in areas of localized sheath damage, or through pinholes which may appear in the sheath during the manufacturing process, this moisture can flow through this channel along the entire length of the cable, thus making the entire cable susceptible to the formation of electrochemical trees and to corrosion of the sheath.

An additional disadvantage of lead cable sheaths is their susceptibility to the development of an insulating corrosive layer, in the presence of carbon black and small amounts of moisture. Such a layer may lead to electrical discharges occurring between the insulation shield and the lead sheath which can result in premature cable failure. Consequently, in order for a lead sheath to be suitable for use with a solid dielectric cable, the sheath should be in electrical contact with the insulation shield of the cable, but physically separated from it. Such a cable is both difficult and expensive to manufacture. Furthermore, the weight of a cable with a lead sheath renders the transportation and installation of long lengths of it difficult.

To overcome the above discussed disadvantages of lead or aluminum sheaths, cable sheaths formed of longitudinally corrugated copper sheets have been utilized in recent years in solid dielectric cables. Cables so comprised do not require expensive manufacturing equipment such as is required for the production of lead sheathed cable. These longitudinally corrugated copper sheaths, however, have an opening extending longitudinally along the entire length of the cable at the overlap area of the sheath. Moisture can enter this opening and diffuse into the insulation layer of the cable. Such a copper sheathed cable typically has a polyolefin jacket which is applied over the longitudinally corrugated copper sheath. This jacket, however, has a tendency to crack along the line of the overlap when the cable is subjected to high operating temperatures.

In accordance with the present invention, an extruded type high voltage cable is provided with a composite cable jacket of novel design for preventing moisture from entering into the insulation structure as long as the jacket is intact. The jacket includes an inner part formed with a corrugated outer surface and an outer part having an inner surface which conforms to the corrugation of the inner part. A moisture barrier (preferably metalic) is sandwiched between the above parts and bonded to them.

A feature of the cable of the present invention is that its construction is such that even if the jacket is punctured, moisture which may enter the puncture is, nevertheless, prevented from flowing longitudinally along the cable. The cable is easy and inexpensive to manufacture, and the simplicity of its design makes it easy to install. Most importantly, the composite jacket of the cable eliminates, or reduces to an insignificant level, the formation of electrochemical trees in the insulation layer of the cable, thereby increasing significantly the cable's useful service life.

It is an object of the present invention, therefore, to provide a solid dielectric high voltage cable suitable for underground installation which has a moisture impervious jacket.

It is a further object of the invention that, if the jacket is punctured, moisture is, nevertheless, prevented from flowing longitudinally along the cable.

It is yet a further object of the invention that the effectiveness of the jacket not be influenced by expansions or contractions of the cable caused by variations in operating temperature.

It is a still further object of the invention that the cable be relatively easy to manufacture, transport and install.

The above objects and further objects, advantages and features of the present invention will be apparent from a consideration of the following description in conjunction with the appended drawings in which:

FIGS. 1a and 1b are cross-sections of an embodiment of a cable in accordance with the present invention;

FIG. 2 is a view of the cable of FIG. 1 in which portions have been cut away, and FIGS. 3a and 3b are cross-sections of a cable in accordance with another embodiment of the invention.

Referring to FIG. 1, there is shown a cross-section of a cable constructed in accordance with an illustrative embodiment of the present invention. The cable includes a conventional polyolefin insulated cable core 9 which is surrounded by a composite jacket 10 of the present invention.

Cable core 9 includes a central conductor 1 which is preferably stranded. Conductor 1 is covered by a conventional conductor shield 2. The conductor shield is, in turn, surrounded by a body of polyolefin type insulation 3 (e.g., polyethylene, crosslinked polyethylene, or ethylene propylene rubber). The insulation is covered by an insulation shield 4 which is also conventional. Typically, such a cable core is formed by extruding the successive layers of the core over the central conductor 1.

The composite jacket 10 preferably comprises metallic moisture barrier 7 which is sandwiched between an inner part 5 and an outer part 6 of the jacket. The composite jacket 10 fits tightly (preferably with modest adhesion) over the cable core 9.

The inner part 5 of the jacket has an inside surface 11 which conforms to and fits tightly against the insulation shield 3, and an outside surface 12 which is corrugated longitudinally to the axis of the cable. Preferably, the inner part 5 is extruded over the insulation shield 4, utilizing a die suitable for producing the corrugations of the outer surface 12. Inner part 5 should be comprised of a material having a temperature rating compatible with the desired temperature rating of the cable. Examples of such materials will be discussed below.

The moisture barrier 7 may be formed of a sheet of metal, such as aluminum or copper, having a thickness sufficient to meet fatigue resistance requirements. Layers of adhesive plastic material 13 are applied to at least one but preferably both sides of this sheet of metal. This adhesive plastic should be a material which is compatible with the type of metal comprising the barrier 7 and with the materials comprising the inner part 5 and the outer part 6 of the jacket. The sheet of metal thus coated is wrapped around the inner part 5 of the jacket prior to the extrusion thereover of the outer part 6 of the jacket. The end portions 16 and 17 of the metallic sheet overlap in the area of FIG. 1 indicated by reference numeral 8. When the outer part 6 of the jacket is extruded over the metallic sheet, the sheet is forced to conform to the corrugations of the outside surface 12 of inner part 5 of the jacket. The seam of the metallic barrier 7 at the area 8 of its overlap is sealed by the fusion of the thin layers of adhesive plastic material 13 in the overlap area 8.

In a cable provided with a composite cable jacket 10, such as the one described above, the cable jacket is free to expand and contract to conform with expansions and contractions of the cable core 9 caused by temperature variations. Because of the novel manner in which the metallic moisture barrier 7 is bonded to both the inner part 5 and the outer part 6 of the jacket, these expansions and contractions do not result in the formation of longitudinal channels adjacent to the moisture barrier 7 through which moisture could flow along the length of the cable. Thus, if moisture subsequently penetrates the moisture barrier 7 by reason of, for example, localized damage to the barrier, moisture encrochment into the insulation layer 3 is limited to the general region of the damage and the remainder of the cable remains free of moisture.

In the embodiment of the invention discussed above sealing of the seam of the metallic moisture barrier 7 at the area of overlap 8 is accomplished by the fusion of the layers of adhesive material 13. It is a feature of the present invention that further moisture protection may be obtained by joining the end portions 16 and 17 of the metallic moisture barrier 7 by means such as welding, soldering, or cementing. Such joining is possible because the corrugated nature of the moisture barrier 7 allows it to accommodate expansion of the cable core 9 even when its end portions 16 and 17 are thus joined. This intimate sealing was not achievable in prior art cable constructions utilizing non-corrugated metallic moisture barriers, because sealing of such non-corrugated barriers in this manner would result in the barrier being incapable of accommodating expansion of the cable core.

In a preferred embodiment of the invention illustrated by FIG. 1, the corrugations of the outer surface 12 of the inner part 5 of the cable jacket 10 are close to sinusoidal in nature. In such an embodiment the total width of the metallic barrier between its edges 16 and 17 may be calculated as follows:

$$W = S \left[ 0.6 + 0.4 (1 + \frac{\pi^2 H^2 n^2}{S^2})^{\frac{1}{2}} \right]$$

Where
W—is the total width of the metallic sheet comprising moisture barrier 7 (measured circumferentially along the corrugated surface);
S—is the circumference of the jacket in the center of the corrugations of the metallic barrier;
H—is the difference between the radii to the peak of the corrugations and to the valleys of the corrugations; and
n—is the total number of corrugations.

In order to accommodate thermal expansion of a polyolefin insulated cable core 9, W/S should be larger than 1.03. This condition can be satisfied when the corrugations are designed such that H.n/S is greater than 0.12. It will be noted that mechanical stresses on the composite jacket such as those that would appear under emergency temperature conditions, may be minimized by increasing the H.n/S ratio. It is, therefore, preferable to design the jacket so that H.n/S is in the range of approximately 0.2 to 0.5 at room temperature.

Referring to FIG. 2, it will be noted that the corrugations may be applied spirally to the outer surface 12 of the inner part 5 of the composite jacket 10. Such a spiral configuration of the corrugations is effective for improving the bending characteristics of the cable. In a preferred embodiment, these spirals have a lay length (L) of between one and two feet. Production of the inner part 5 of the jacket with such spiral corrugations may be accomplished by utilizing a rotating die for the extrusion of this layer of the jacket.

As previously discussed, the moisture barrier 7 of the present invention, may be comprised of a metal such as aluminum or copper, and the layers of adhesive material 13 applied to both sides of the metallic barrier should be of a material which is compatible with the metal comprising the moisture barrier 7 and with the materials comprising the inner part 5 and outer part 6 of the composite jacket 10.

In an illustrative embodiment of the invention, an aluminum moisture barrier is utilized. The adhesive layers 13 of this embodiment may, therefore, be comprised of a carbon black particle or metallic fiber filled semiconducting compound. These carbon black particles or metallic fibers (e.g., aluminum fibers) serve to assure that the adhesive layers 13 will be conducting. It will be indicated that conductivity of the adhesive layers 13 is desirable to prevent undesirable electrical breakdowns occurring between the surfaces of the moisture barrier 7 and the insulation shield. Such breakdowns may occur, for example, if the aluminum moisture barrier is not in electrical contact with a carbon black filled insulation shield.

In the above embodiment, the inner part 5 of the cable jacket may also be composed of a semiconducting compound such as ethylene vinyl accetate copolymer containing carbon black particles or metallic fibers. The outer part 6 of the cable jacket 10 may be composed of a polyolefin-type material such as low or high density polyethylene used in present jackets. Alternatively, the outer part 6 of the jacket can be a cross-linked material such as cross-linked low density or high density polyethylene. Such cross-linking of the outer part 6 of the jacket serves to improve the jacket's resistance to high temperature and abrasion. Furthermore, cross-linking of the outer part of the jacket offers superior resistance to cracking.

In an alternative embodiment of the invention the moisture barrier 10 is made of copper. In this case the adhesive layers 13 and the inner part 5 of the jacket may be suitable carbon black filled semiconducting compounds. As in the first embodiment discussed below, the outer part 6 of the jacket may be formed of a conventional or cross-linked low or high density polyethylene. If it is desired to have an electric contact between the copper moisture barrier, the adhesive layer, and the outer part of the jacket, the outer part 6 may be made of a semiconductor, e.g. carbon black particle-filled low or high density polyethylene.

In both of the above embodiments, the moisture barrier 7 serves as a return conductor for the cable. In applications where it is desired that the cable have a high current-carrying capacity, however, the current-carrying capacity of the moisture barrier 7 may prove to be insufficient. In such situations, therefore, it may be necessary to provide the cable with additional return conductors.

Referring to FIG. 3, there is shown an embodiment of a cable in accordance with the present invention which is suitable for high-current applications. This embodiment is similar to the one illustrated by FIG. 1 except that the inner part 5 of the jacket is provided with a plurality of channels 20, each of which carries a return conductor 21. The spaces 22 surrounding return conductors 21 may be filled with a soft rubber-type material in either solid or foam form. Alternatively, the spaces 22 may be filled with a high molecular weight jelly-type material. In this embodiment, the inner part 5 of the jacket may be formed of an insulating compound.

It will be understood that the foregoing description of preferred embodiments of the present invention is for purposes of illustration only, and that the various structural and operational features as herein disclosed are susceptible to a number of modifications and changes none of which entail any departure from the spirit and scope of the present invention as defined in the hereto appended claims.

What is claimed is:

1. A moisture resistant electrical cable comprising:
   a cable core including a conductor and a body of insulating material surrounding said conductor, and
   a composite cable jacket surrounding said core including,
   an inner part surrounding said core and having a corrugated outer surface wherein said corrugations form spirals having an axis substantially coextensive with the axis of said cable and a lay length of at least approximately one foot,
   an outer part, formed of a material selected from the group consisting of polyolefin, cross linked polyolefin and ethylene propylene rubber, surrounding said inner part and having an inner surface conforming to said corrugated outer surface,
   a moisture barrier comprising a metallic sheet having overlapping end portions forming a seam, said sheet being sandwiched between said inner part and said outer part so as to conform to said inner and outer surface,
   means for bonding said barrier to said inner part and to said outer part,
   and means for bonding said end portions to each other;
   wherein a factor of H·n/s of said barrier is greater than 0.12 at room temperature: where
   S is the circumference of said jacket at the center of said corrugations,
   H is the difference in length between a radius from the center of said cable to a peak of one of said corrugations and a radius from said cable center to a valley of one of said corrugations, and
   n is the number of said corrugations counted in a circumferential direction.

2. The cable of claim 1 wherein:
   said metallic sheet is formed of aluminum; and
   said first bonding means comprises a layer of metallic fiber filled semiconducting adhesive material.

3. The cable of claim 2 wherein said inner part is formed of a metallic fiber filled semiconducting material.

4. The cable of claim 1 wherein:
   said metallic sheet is formed of copper; and
   said first bonding means comprises a layer of carbon filled semiconducting adhesive material.

5. The cable of claim 4 wherein said inner part comprises a carbon filled semiconducting material.

6. The cable of claim 1 wherein said inner part is formed to include a plurality of longitudinal channels, and further comprising:
   a return conductor longitudinally coextensive with said cable within each of said channels.

7. The cable of claim 6 further comprising:
   a body of soft rubber type material within each of said channels, surrounding said return conductor and longitudinally coextensive therewith.

8. The cable of claim 6 further comprising:
   a body of high molecular weight jelly type material within each of said channels, surrounding said return conductor and longitudinally coextensive therewith.

9. The cable of claim 1 wherein H·n/s is in between 0.2 and 0.5 at room temperature.

10. The cable of claim 1 wherein said corrugations are sinusoidal or nearly sinusoidal and wherein the width (W) of said barrier measured between said end portions is defined by the equation $$W = S \left[ 0.6 + 0.4 \left( 1 + \frac{\pi^2 H^2 n^2}{S^2} \right)^{\frac{1}{2}} \right].$$

* * * * *